Feb. 25, 1947.  W. A. DEPP  2,416,290
CATHODE RAY OSCILLOSCOPE CIRCUIT
Filed Oct. 2, 1942   2 Sheets-Sheet 1

INVENTOR
W. A. DEPP
BY G. H. Heydt.
ATTORNEY

Feb. 25, 1947. W. A. DEPP 2,416,290
CATHODE RAY OSCILLOSCOPE CIRCUIT
Filed Oct. 2, 1942 2 Sheets-Sheet 2
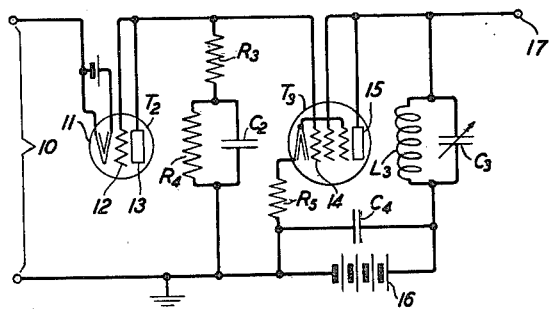
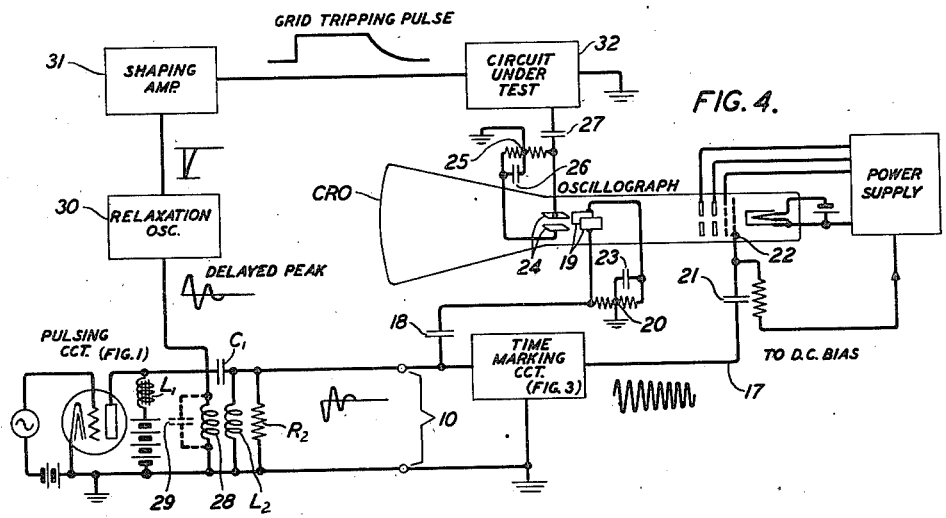
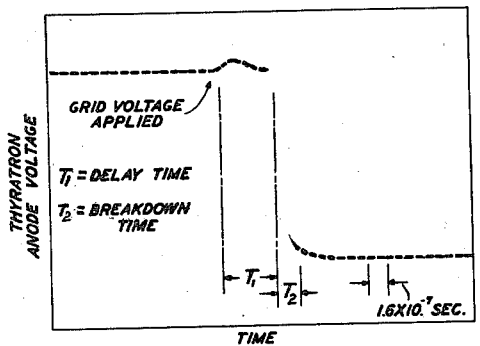
INVENTOR
W. A. DEPP
BY G. H. Heydt
ATTORNEY Patented Feb. 25, 1947

2,416,290

UNITED STATES PATENT OFFICE 2,416,290

CATHODE-RAY OSCILLOSCOPE CIRCUIT

Wallace A. Depp, Elmhurst, N. Y., assignor to Bell Telephone Laboratories, Incorporated, New York, N. Y., a corporation of New York Application October 2, 1942, Serial No. 460,532

10 Claims. (Cl. 315—22)

This invention relates to circuits for cathode ray oscilloscopes, particularly to such as permit impressing a timing signal on the electron trace shown on the oscilloscope screen.

Means are well known for producing a timing trace separate from the trace of the phenomenon under investigation. For example, such are disclosed in United States Patent 2,132,225 to V. Subrizi. Likewise, means are known for causing momentary brightening of the trace due to a recurrent phenomenon, such as are described in United States Patent 1,969,573 to A. W. Montgomery. However, so far as is known, no means are available for the direct time marking, at constant intervals of a fraction of a micro-second, of the trace of a recurrent electrical transient of which the recurrence frequency is low. It is, therefore, an object of the present invention to provide means for applying a high frequency timing signal directly to the trace on a cathode ray oscilloscope screen representing a recurrent transient phenomenon.

Such a transient may recur with imperfect regularity in time, in which event it is clearly futile to attempt to synchronize a high frequency timing wave of any character with the recurrence of the transient. By the circuit of the present invention the timing wave is established in fixed time relationship to the initiation of the transient, making no demand that the transient itself recur with ideal regularity. Accordingly, a second object of the invention is to provide means for the direct application of a time scale to the individual recurrences of a transient represented on the screen of a cathode ray oscilloscope, maintaining a fixed time relationship between the onset of each recurrence of the transient and the time scale thereto applied.

In order that a steady trace shall be produced on the oscilloscope screen so that a visual or photographic record may be obtained, it is also requisite that the initiation of the sweep impulse on the horizontal deflecting elements of the oscilloscope be unalterably related in fixed time sequence to the initiation of the transient to be shown on the vertical deflecting elements of the cathode ray oscilloscope. It is, therefore, a third object of the invention to provide for the investigation of transient phenomena a circuit wherein a primary impulse establishes in an unvarying time sequence: first, a sweep impulse; second, a timing signal effective to brighten momentarily at regular and minute time intervals the trace observed on the oscilloscope screen; and third, the transient voltage to be analyzed.

It has been found possible to accomplish the stated objects of the invention in the following way: a shock-excited circuit is used, first, to generate a voltage pulse which is applied directly to the horizontal deflecting elements of the oscilloscope; second, to release by means of this pulse high frequency oscillations in a second circuit, which oscillations are superimposed on the control grid of the oscilloscope and thereby cause the spot brightness to vary with time; and, third, to derive inductively from the original shock-excited pulse a voltage controllably delayed with respect thereto and effective to trigger off a recurrence of the transient phenomenon under study from which is produced a voltage on the vertical deflecting elements of the oscilloscope. By such an arrangement each recurrence of the transient is treated as an independent phenomenon and occurs in fixed time relationship to the initiation of the horizontal deflection of the electron spot. Furthermore, the timing signal which causes periodic brightening of the observed trace is likewise in fixed time relation to the sweep and to the onset of the transient. It is thus possible for the transient to recur with less than perfect regularity in time and still be represented by a steady trace on the oscilloscope screen with no need for synchronizing means of the usual kind.

The invention will now be described with reference to the accompanying drawings in which:

Fig. 1 is a diagram of the shock circuit utilized for the sequential instigation of the sweep voltage, of the timing wave, and of the transient to be investigated;

Fig. 2a exhibits the relationship between the period of the alternating supply voltage and that of the shock circuit itself;

Fig. 3 is a diagram of the time marking circuit generating a high frequency timing wave in response to the voltage pulse shown in Fig. 2b;

Fig. 4 is a diagram, partly schematic, of the complete circuit, including a cathode ray oscilloscope as arranged to study the breakdown of a "Thyratron"; and Fig. 5 is representative of the trace on the oscilloscope screen provided by the circuit of Fig. 4.

In all figures like numerals and letters identify like elements.

Figure 1:
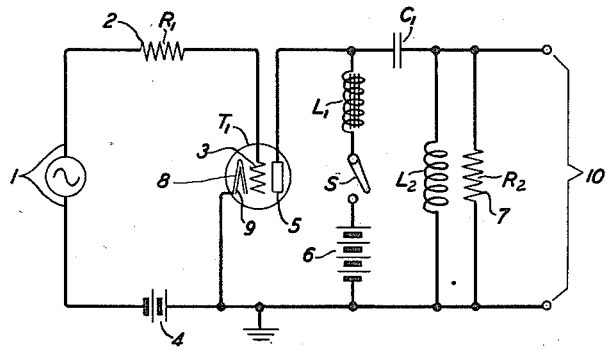

Referring to Fig. 1, an alternating voltage of any convenient frequency, say 60 cycles, is applied between terminals 1 in series with resistor 2 and the grid-cathode circuit of tube $T_1$ which may suitably be a "Thyratron," such as the Western Electric 338A. Grid 3 of Tube $T_1$ is negatively biased by battery 4 for which a suitable voltage is 6 volts. Anode 5 of Tube $T_1$ is supplied through inductance $L_1$ from battery 6 when switch S is closed. Shunting the anode to ground path of tube $T_1$ is a series combination of condenser $C_1$ and inductance $L_2$, the latter itself shunted by resistor 7. Cathode 8 of tube $T_1$ is connected to ground, as indicated, and is thus also connected to the terminals of $L_2$ and resistor 7 remote from condenser $C_1$, to the negative side of battery 6, and through battery 4 to one terminal of the alternating voltage applied across terminal 1. In tube $T_1$ cathode 8 is heated by a heater element 9 which requires no description.

It is clear that the circuit described is a simple relaxation circuit. When switch S is closed, it may be shown by mathematical analysis that condenser $C_1$ is charged up approximately sinusoidally to about twice the voltage of battery 6. If the time constant of $L_1C_1$ is properly chosen, condenser $C_1$ when substantially fully charged, will be discharged through tube $T_1$ near the instant of a positive peak of the supply voltage across terminals 1. This result may be assured by choosing $L_1$ and $C_1$ of such values that the natural period of their combination is twice that of the voltage at 1. $L_2$ is of so small inductance that it may be ignored in comparison with $L_1$ for this purpose.

After $C_1$ discharges through $T_1$ it charges up to the opposite polarity by reason of the inertia of $L_2$ and acquires a voltage numerically approximately as great as that of opposite sign to which $C_1$ is initially charged on closing switch S. At the instant of maximum reversed voltage of $C_1$ the current through $T_1$ is zero. Since $T_1$ is a rectifier, it passes no current until battery 6 has recharged $C_1$ to its original polarity and the supply voltage at terminals 1 is again of the sign and magnitude appropriate to make $T_1$ conductive. It may be shown that after the first charging of condenser $C_1$ to a negative voltage approximately twice that of battery 6, later cycles involve a charging voltage on $C_1$ progressively greater than the initial but only a few cycles are required for the stabilization of the potential received by $C_1$ at a value some three or four times that of battery 6. The time interval between successive firings of tube $T_1$ is $\frac{1}{60}$ second. In the case shown this is, therefore, the length of the cycle of operation of the circuit shown in Fig. 1 which may be termed the "pulsing circuit."

Figure 2A:
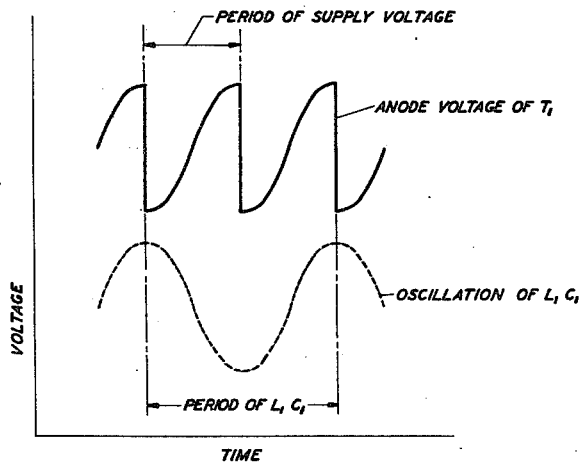
Fig. 2b shows the type of voltage pulse derived from the shock circuit of Fig. 1.

The relationship of the period of the supply voltage and of the combination $L_1C_1$ is shown in Fig. 2a which likewise exhibits the phase relation of the supply voltage to the voltage on $C_1$, a relation which is automatically established by the operation of the circuit of Fig. 1. If $L_1$ is 1400 henries and $C_1$ is 0.02 microfarad, the time period of $L_1C_1$ is $\frac{1}{30}$ of a second, appropriate to a 60-cycle supply voltage.

Figure 2B:
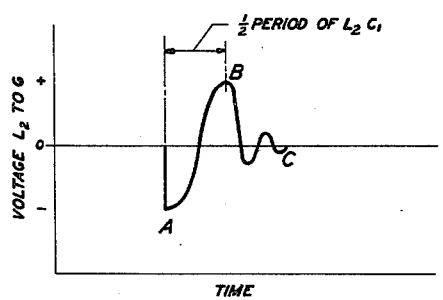

At the moment tube $T_1$ becomes conducting, the voltage across inductance $L_2$ is negative with respect to ground at its terminal adjacent to condenser $C_1$ as shown at A in Fig. 2b. The discharge and subsequent recharge with reversed polarity of $C_1$ result in a voltage pulse across $L_2$ shown as the segment AB, Fig. 2b. Terminals 10 of Fig. 1 serve to transmit this voltage pulse to the subsequent circuit of Fig. 3. Succeeding this pulse appear oscillations (represented in Fig. 2b by the portion BC of the curve there drawn) in the voltage across $L_2$ determined by the resonance of $L_2$ with its own distributed capacity together with that of the load connected across $L_2$; these oscillations are damped by the shunt resistor $R_2$. Here the time scale is exaggerated for clearness. Conveniently, $L_1$ is chosen to be some 1400 henries while $L_2$ is about 1 millihenry so that a half period, from A to B, Fig. 2b, of $C_1L_2$ is shorter than that of $C_1L_1$ in the approximate ratio of 1200 to 1. That is when, 60 cycles is the frequency of the control voltage at terminals 1, the half period of $C_1L_2$ is about 14 microseconds. The stated ratio between the period of $C_1L_1$ and that of $C_1L_2$ is merely for convenience, since the period of $C_1L_2$ is fixed by the desired interval of sweep. In this time it is desired to establish, first, a sweep voltage on the horizontal plates of the cathode ray oscilloscope; second, a timing signal to brighten at periodic intervals the electron trace; and, third, a voltage impulse effective to initiate the transient phenomenon to be analyzed.

The horizontal sweep voltage is obtainable directly from the voltage across $L_2$ during the half period swing from A to B, Fig. 2b. How the timing signal is derived from this pulse will be evident from a description of Fig. 3.

In Fig. 3 the output voltage of the pulsing circuit of Fig. 1, namely, the voltage across inductance $L_2$, is applied at input terminals 10 between ground and cathode 11 of tube $T_2$ which may properly be a triode, such as the 1G4G, connected as a diode detector by joining, as shown, its grid 12 and anode 13. $T_2$, connected as stated, isolates condenser $C_2$ from inductance $L_2$, thereby preventing the discharge of $C_2$ (when negatively charged) through $R_3$ and $L_2$, and also the positive recharge of $C_2$ when a positive voltage appears across $L_2$. A voltage pulse from the pulsing circuit of Fig. 1 traverses tube $T_2$ charging condenser $C_2$ through resistor $R_3$ and simultaneously cutting off tube $T_3$ to grid 14 of which anode 13 is directly connected. Tube $T_3$ is, for example, a 6F6 connected as a triode. The negative charge on condenser $C_2$ leaks off through resistor $R_4$ before the arrival of the next negative impulse from the pulsing circuit. As the voltage across $L_2$ varies from a negative value at A through zero to a positive value at B, Fig. 2b, the negative charge on condenser $C_2$ serves to hold grid 14 at the cut-off of tube $T_3$.

The output circuit of tube $T_3$ comprises anode 15 and 250-volt battery 16 in series with the parallel resonant circuit $L_3C_3$. When tube $T_3$ is driven to cut-off by the negative pulse received from $L_2$ through tube $T_2$ oscillations are excited in circuit $L_3C_3$ which are suitable to be applied over terminal 17 to the control grid of the cathode ray oscilloscope and by periodic variation of the potential of that grid to brighten and darken alternately the fluorescent spot on the oscilloscope screen. These oscillations of spot brightness result in impressing a time scale on the trace already set in horizontal motion by the voltage pulse across $L_2$ directly impressed on the sweep plates. Choosing $L_3$ as 20 microhenries and $C_3$ as 20 micromicrofarads, we obtain a timing signal of frequency of 8 megacycles per second, whereby more than 100 time intervals may be marked on the trace during the sweep interval which, as stated, is approximately 14 microseconds. The sweep starts always from the same location on the fluorescent screen, a location determined by initial adjustments of the cathode ray tube which are well known and require no description here. Equally the timing signal begins at a fixed interval after the start of the sweep and both sweep and timing signals are repetitive at the frequency of the alternating voltage supplied to terminals 1 of Fig. 1. It remains now to describe the means whereby a transient to be studied is initiated in fixed time relation to the sweep and to the time signal, from which transient a voltage is obtained to be represented by vertical deflection of the time marked trace.

In Fig. 4 the voltage across $L_2$ is applied through stopping condenser 18 to one of the horizontal plates 19 of cathode ray oscilloscope CRO, the two horizontal plates being connected through resistor 20 the mid-point of which is grounded. The sweep voltage is thus directly provided from the pulsing circuit of Fig. 1. The time marking circuit of Fig. 3 is connected, as indicated, through stopping condenser 21 to control grid 22 of the oscilloscope CRO. This control grid is provided with the customary direct current bias to provide an electron spot of desired average brightness. The usual elements of the oscilloscope including power supply therefor are shown in Fig. 4 without specific notation, these elements not being concerned in the present invention. Condenser 23 in shunt between ground and the horizontal plate to which the sweep impulse is not applied, short-circuits, so far as concerns alternating current, one part of resistor 20, while leaving undisturbed the direct voltage, not shown, which is customarily used to locate the starting position of the electron spot. The inherent minute delay through the time marking circuit insures the application of the timing voltage in superposition on the direct current control grid bias just after the start of the sweep.

The vertical plates 24 of oscilloscope CRO are shunted by resistor 25 of which the mid-point is grounded and one-half shunted by condenser 26 for the same reason that a similar combination of resistor 20 and condenser 23 is used in the case of the horizontal plates 19. The vertical plate opposite the plate shunted to ground by condenser 26 receives the transient voltage to be analyzed. This transient voltage is derived in any convenient way from the circuit under test and applied, as indicated in Fig. 4, to one of the plates 24 through stopping condenser 27. To initiate the transient phenomenon under investigation, inductance 28 is magnetically coupled to inductance $L_2$ of the pulsing circuit. The voltage pulse of Fig. 2b, A to B, produces in inductance 28 a corresponding pulse delayed with respect to the inducing pulse by reason of the distributed capacity of inductance 28. This induced pulse is used to trigger the operation of the circuit it is desired to investigate. To obtain a longer time delay, condenser 29, shown in dotted line in Fig. 4, may be used to shunt inductance 28 and may be given a value appropriate to insure the desired delay for the induced pulse. An air condenser of small value is sufficient for this purpose and in the usual case no condenser 29 is required.

Fig. 4 shows, as an illustration, the application of the circuit of the invention to study the breakdown of the "Thyratron." The pulsing circuit of Fig. 1 provides, in the manner already described, horizontal sweep voltage and the timing voltage applied to the control grid of the oscilloscope. A delayed voltage pulse, indicated as a "delayed peak" is derived from inductance $L_2$ by means of inductance 28 and serves to set in operation relaxation oscillator 30 which may be of any desired kind. The output of oscillator 30 is a sharp impulse which may be converted to the required shape by a shaping circuit 31, such as is well known in the art. The impulse so shaped, indicated as the "grid-tripping pulse" is applied to the grid of the "Thyratron" 32 of which the anode voltage through condenser 27 is connected to one of the vertical plates 24.

Fig. 5 is redrawn from an actual photograph of a trace representing the breakdown of the "Thyratron." The oscillation frequency of $L_3C_3$, Fig. 3, was 6 megacycles per second. In this case, after a delay of about ½ microsecond, the anode voltage of the "Thyratron" under test fell to zero in about ⅙ microsecond. The brightness variations of the trace, actually sinusoidal, appear, as the result of contrast, as slightly elongated bright spots, black on the drawing of Fig. 5 which should be considered as a photographic negative.

The tuning of oscillating circuit $L_3C_3$ is conveniently done by coupling across $L_3$ the output of a calibrated oscillator and varying $C_3$ while the entire circuit is in operation. Indentity of the resonant frequency of $L_3C_3$ with the frequency of the calibrated oscillator is shown by general brightening of the screen trace without impairment of the distinctness of the time markings.

It is to be noted that the voltage pulse, A to B of Fig. 2b, includes a nearly straight pulse which corresponds to a sweep nearly linear with time. It is, however, unnecessary that the sweep be ideally linear, inasmuch as the points of increased spot brightness are of accurately uniform time spacing. Also, it is clear that the horizontal sweep of the electron spot begins always at a point on the screen determined by the initial spot biasing adjustment, and that the timing scale commences at a fixed interval after the start of the sweep and thereafter, again at a fixed time interval, the transient to be examined is initiated. The sequence described is thus invariable in time and in screen location so that the observed pattern is steady on the oscilloscope screen.

Provided the $$Q\left(=\frac{\omega L}{R}\right)$$

of inductance $L_3$ is reasonably good, say 150, more than 50 time markings may be impressed on the trace before the oscillations of $L_3C_3$ have decayed too far for distinct marking. Should there be demanded for the oscilloscope control grid a higher voltage than is derived from the time marking circuit directly, this voltage may be amplified by a conventional amplifier of which the anode circuit is tuned to the frequency of $L_3C_3$. It is essential that in using such an amplifier, tuning be in its output and not in its input circuit to avoid generating a double frequency when $L_3C_3$ is shock excited. When amplification is used to amplify the voltage developed across $L_3C_3$ a volume limiter may be included whereby many more oscillations of desired intensity may be applied to control grid 22.

In the circuits described, suitable values for the involved resistances, inductances and capacitances are as follows:

For the pulsing circuit of Fig. 1:
$R_1 = R_2 = 10,000$ ohms
$L_1 = 1400$ henries
$L_2 = 1$ millihenry
$C_1 = 0.02$ microfarad For the time marking circuit of Fig. 3:
$R_3 = 20,000$ ohms
$R_4 = 0.1$ megohm
$R_5 = 450$ ohms
$L_3 = 20$ microhenries
$C_2 = 0.001$ microfarad
$C_3 = 20$ micromicrofarads (for 8 megacycles per second)
$C_4 = 0.1$ microfarad While the invention has been described in its specific application to study the breakdown of a "Thyratron," it will be obvious that this is not the only illustration which might be chosen. The invention is applicable to the study of any phenomenon which is capable of representation on the screen of a cathode ray oscilloscope. Minor circuit changes, well understood by those skilled in the art, will enable the circuit described to be applied to a cathode ray tube using magnetic instead of electrostatic deflecting elements.

It is to be understood that by "shock excitation" is meant the abrupt release of the electrical energy stored in condenser $C_1$ from battery 6, or that stored in condenser $C_3$ from battery 16. The action initiating the desired sequence of events is the discharge of condenser $C_1$ at the instant tube $T_1$ becomes conducting; this constitutes the shock excitation of the circuit composed of $L_2$, $C_1$ and tube $T_1$. Obviously, in the storage circuit shown comprising battery 6, inductances $L_1$ and $L_2$ and condenser $C_1$, the place of inductance $L_1$ may be taken by a resistor so chosen that Condenser $C_1$ shall be substantially completely charged within a time interval equal to the period of the alternating supply voltage 1. If this substitution is made, the limitation is removed which required that the oscillations of $L_1C_1$ have a period twice that of the supply voltage. That limitation was imposed to insure that the voltage on $C_1$ released by the firing of tube $T_1$ should not vary from cycle to cycle, since it is this voltage which determines the sweep amplitude. When a resistor is used in place of $L_1$ the successive chargings of $C_1$ are all alike and tube $T_1$ may be fired at any instant after $C_1$ has acquired a substantially complete charge. Then the sweep amplitude is constant, the disadvantage being that the voltage across $C_1$ never exceeds the battery voltage, for which reason the sweep amplitude is less than with the circuit illustrated in Fig. 1.

Alternatively, inductance $L_1$ may be retained and a diode introduced in series, connecting its anode to the positive terminal of battery 6 and its cathode to the end of inductance $L_1$ previously connected to battery 6. In this case $L_1$ need not have the high inductance mentioned in the table of circuit constants but may be chosen of such inductance as to permit charging $C_1$ in a very short time, say $1/5000$ second. The presence of the diode prevents reversal of the polarity of the voltage on $C_1$ and the firing of the tube may recur as frequently as desired or as limited by the characteristics of the circuit whose behavior is to be investigated by means of the invention. Moreover, since the charge of condenser $C_1$ is rapidly acquired and is retained indefinitely (if the leakage be negligible) the transient to be studied may have a very low frequency of recurrence. If the value chosen for $L_1$ corresponds to $1/5000$ second for the charging of $C_1$, the phenomenon to be studied may recur at low or at high frequency (not higher than 5,000 per second) or may actually be of random recurrence, if firing voltage 1 is random instead of periodic, provided the interval between successive recurrences be not less than $1/5000$ second.

Clearly, equivalents may be found for the other major elements described. For the time marking circuit of Fig. 3, instead of the resonant circuit $L_3C_3$, one may use a high frequency multivibrator. Finally, the triggering of the transient may be effected by a relay the winding of which is traversed by the discharge of $C_1$, or by a vacuum tube rendered conductive by a voltage on its grid derived in any known manner from the discharge of $C_1$, or by other expedients readily occurring to one skilled in the art.

It will be observed that in all the cases discussed, a circuit is employed in which electrical energy is stored and the abrupt discharge of the energy in this storage circuit is utilized to produce directly a sweep voltage and indirectly a time signal superimposed on the sweep and a voltage initiating the transient under investigation in the sequence stated.

What is claimed is:

1. The method of timing a transient phenomenon to be studied by a trace on the screen of a cathode ray oscilloscope including at least a pair of sweep plates which comprises generating a voltage pulse, producing from said pulse in sequence a deflecting voltage on said sweep plates, a voltage effective to brighten said trace at regular time intervals, and a voltage effective to initiate said transient phenomenon and initiating said phenomenon by said last-mentioned voltage.

2. The method of timing a transient phenomenon represented by a trace on the screen of a cathode ray oscilloscope which comprises generating a voltage pulse, deriving from said pulse a first voltage effective to brighten said trace at regular time intervals and a second voltage effective to initiate said phenomenon, maintaining a fixed time relationship between said voltages and initiating said phenomenon by said second voltage.

3. In the study of a recurrent phenomenon by its representative trace on the screen of a cathode ray oscilloscope provided at least with horizontal and vertical deflecting means, the method of producing in identical location on said screen successive traces each representative of a recurrence of said phenomenon which comprises generating a voltage pulse, producing from said pulse a deflecting voltage on said horizontal deflecting means, producing from said pulse in fixed time relation to said deflecting voltage a voltage initiating a recurrence of said phenomenon and producing from said phenomenon so initiated a deflecting voltage on said vertical deflecting means.

4. In the study of a recurrent phenomenon by its representative trace on the screen of a cathode ray oscilloscope provided at least with a control grid and with horizontal and vertical deflecting means, the method of producing and time marking in identical location on said screen successive traces each representative of a recurrence of said phenomenon which comprises generating a voltage pulse, producing from said pulse in sequence a deflecting voltage on said horizontal deflecting means, a periodic timing voltage on said control grid in fixed time relationship to said deflecting voltage and a voltage initiating a recurrence of said phenomenon likewise in fixed time relationship to said deflecting voltage and producing from said phenomenon so initiated a deflecting voltage on said vertical deflecting means.

5. A timing circuit for the analysis of a recurrent transient voltage comprising a cathode ray oscilloscope including a fluorescent screen, horizontal and vertical deflecting elements, a control grid and means for producing on said screen a trace varying in brightness with the potential of said grid, a first resonant circuit coupled to said horizontal deflecting elements, means for shock exciting said first circuit to produce therefrom a voltage pulse on said horizontal elements, a second resonant circuit coupled to said grid, means controlled by said pulse to produce by shock excitation of said second circuit a high frequency alternating voltage to vary the potential of said grid, an inductance magnetically coupled to said first circuit to derive from said voltage pulse a second voltage pulse, means controlled by said second voltage pulse to produce said transient voltage and means for impressing said transient voltage on said vertical deflecting elements.

6. A timing circuit as in claim 5 wherein said inductance is shunted by an adjustable capacitance whereby said second pulse is capable of being adjustably delayed with respect to said first-mentioned pulse.

7. In a timing circuit for the analysis of a recurrent transient voltage represented by a trace on the fluorescent screen of a cathode ray oscilloscope provided at least with horizontal and vertical deflecting elements and a control grid the potential of which determines the brightness of said trace, means for providing for said trace in sequence a horizontal deflecting voltage and a high frequency variation in brightness comprising a first resonant circuit adapted to produce when shock excited a voltage pulse on said horizontal elements, means for shock exciting said first circuit and a second resonant circuit controlled and shock excited by said pulse to produce on said grid high frequency potential variations.

8. For the study of an electrical transient by means of its representative trace on the screen of a cathode ray oscilloscope provided at least with horizontal deflecting elements, means for producing said transient, means for generating in fixed time relationship a deflecting voltage on said elements and a voltage controlling said transient producing means, said transient comprising a resonant circuit adapted on shock excitation to produce said deflecting voltage, means for shock exciting said circuit, and an inductance magnetically coupled with said circuit and deriving from said circuit when shock excited an induced voltage initiating said transient.

9. Means as in claim 8 wherein said inductance is shunted by a variable capacitance whereby said induced voltage may be variably delayed with respect to said deflecting voltage.

10. For the analysis of a recurrent transient voltage represented by a trace on the screen of a cathode ray oscilloscope provided at least with a fluorescent screen, horizontal and vertical deflecting elements, a control grid and means for producing on said screen a trace varying in brightness with the potential of said grid, a timing circuit including a storage circuit capable of storing electrical energy and coupled to said horizontal deflecting elements, means for storing electrical energy in said storage circuit, means for the shock excitation of said storage circuit to produce therefrom a voltage pulse on said horizontal deflecting elements, a resonant circuit coupled to said grid, means controlled by said voltage pulse to produce by shock excitation of said resonant circuit an alternating voltage varying the potential of said grid, a circuit coupled to said storage circuit to derive therefrom a second voltage pulse, means controlled by said second voltage pulse for producing said transient voltage and means for impressing said transient voltage on said vertical deflecting means.

WALLACE A. DEPP.

REFERENCES CITED

The following references are of record in the file of this patent:

UNITED STATES PATENTS

| Number | Name | Date |
|---|---|---|
| Re. 20,945 | Bedell | Dec. 13, 1938 |
| 1,933,219 | Nakajima et al. | Oct. 31, 1933 |
| 2,269,226 | Rohats | Jan. 6, 1942 |
| 2,151,313 | Bagno et al. | Mar. 21, 1939 |
| 2,219,188 | Kuehni | Oct. 22, 1940 |
| 2,121,359 | Luck et al. | June 21, 1938 |
| 2,222,943 | George | Nov. 26, 1940 |
| 2,234,830 | Norton | Mar. 11, 1941 |
| 2,143,397 | White | Jan. 10, 1939 |
| 2,182,555 | Geiger | Dec. 5, 1939 |

Disclaimer 2,416,290.—*Wallace A. Depp*, Elmhurst, N. Y. CATHODE-RAY OSCILLOSCOPE CIRCUIT. Patent dated Feb. 25, 1947. Disclaimer filed Dec. 23, 1948, by the assignee, *Bell Telephone Laboratories, Incorporated*.

Hereby enters this disclaimer to claim 3 of said patent.

[*Official Gazette January 25, 1949.*]